United States Patent
Song

[11] Patent Number: 5,839,326
[45] Date of Patent: Nov. 24, 1998

[54] PEDAL AND PEDAL-LENGTH CONTROLLER FOR AUTOMOBILE

[76] Inventor: Young-ryeol Song, 122-907, JinheungApt., Anyang 1-dong, Anyang-city, Kyungki-do, Rep. of Korea

[21] Appl. No.: 659,946

[22] Filed: Jun. 7, 1996

Related U.S. Application Data

[62] Division of Ser. No. 293,687, Aug. 19, 1994, abandoned.

[30] Foreign Application Priority Data

Nov. 12, 1993 [KR] Rep. of Korea ...................... 93-23754

[51] Int. Cl.⁶ .................................................. G05G 1/16
[52] U.S. Cl. .............................. 74/562; 403/104; 403/107
[58] Field of Search ............................. 74/562, 544, 525, 74/594.7; 403/104, 107, 105, 108

[56] References Cited

U.S. PATENT DOCUMENTS

| | | | |
|---|---|---|---|
| 969,670 | 9/1910 | Stickel | 74/562 X |
| 1,096,339 | 5/1914 | Adams | 74/562 |
| 1,293,101 | 2/1919 | Hughes | 74/562 |
| 1,346,361 | 7/1920 | Williams | 74/562 |
| 1,484,847 | 2/1924 | Rivers et al. | 74/562 |
| 1,544,256 | 6/1925 | McIntosh | 74/562 |
| 1,556,921 | 10/1925 | Emerson | 74/562 |
| 2,893,351 | 7/1959 | Wager | 403/107 X |
| 3,306,639 | 2/1967 | Lyon | 403/107 |
| 4,378,173 | 3/1983 | Hopwell | 403/108 |
| 5,259,821 | 11/1993 | Bryant | 403/108 X |

*Primary Examiner*—Charles A. Marmor
*Assistant Examiner*—Mary Ann Battista
*Attorney, Agent, or Firm*—Dvorak & Orum

[57] ABSTRACT

An apparatus attaches to an automobile brake pedal lever in such a way as to allow a statuesquely small automobile operator the ability to adjustably control the total brake pedal length so that he can comfortably remain a safe distance from the steering wheel while still reaching the brake. This control apparatus has a leaf spring element that provides temporary self-supporting capability so that the optimum arrangement can be found before the controller is more stably connected to the existing brake pedal.

6 Claims, 8 Drawing Sheets

PEDAL AND PEDAL-LENGTH CONTROLLER FOR AUTOMOBILE

This is a divisional of application Ser. No. 08/293,687 filed on 19 Aug. 1994, now abandoned.

BACKGROUND OF THE INVENTION

The present invention relates to a pedal and pedal-length controller for an automobile, and more particularly, to a pedal and pedal-length controller for an automobile whose structure is improved to control the length of a pedal in accordance with the length of a driver's legs.

Figure 1:
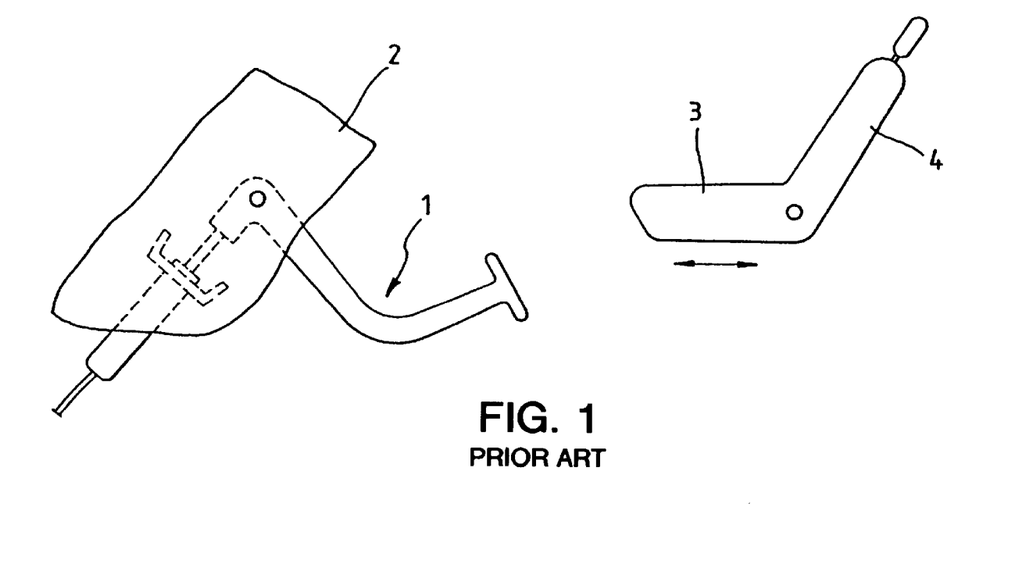
FIG. 1 is a schematic of a conventional pedal for an automobile and its relative position with respect to a car seat.

Automobiles are ordinarily equipped with foot-operated pedals such as an accelerator, clutch and brake. Referring to FIG. 1 showing the general relationship between a conventional pedal and a car seat, a pedal 1 having a predetermined length is hinged to a plate 2. Here, in order to facilitate pedal operation when seated on a driver's seat 3 having a seat back 4, the operator (driver) adjusts the seat forward or backward according to the driver's height, or more specifically, according to the length of the driver's legs.

However, when the very short-legged driver drives with driver's seat 3 pulled completely forward, certain inconveniences and/or problems follow. First, when the driver uses a side mirror or rear-view mirror, his or her head is in an awkwardly contorted position, making it difficult to simultaneously observe forward and side areas, which is unsafe. Second, since the driver is thus positioned uncomfortably close to the steering wheel, proper wheel operation is difficult. Third, when the driver operates the pedal, the leg's ariculate angle is almost rectangular so that easy operation of the automobile is hindered.

Meanwhile, if the driver undertakes to drive with driver's seat 3 pushed too far back for the length of his or her legs, the driver operates the pedals with his or her legs overly extended, which quickens leg fatigue during long trips. In an attempt to remedy this situation, drivers often fix driver's seat 3 at a position forward enough so that the pedal is easy to operate, and then leans the seat back 4 in order to increase the distance between his or her upper body and the steering wheel. In such an event, the driver is in a near prone position which is not conducive for safe driving, nor is it comfortable since it tends to create pains in the neck, shoulder or back.

SUMMARY OF THE INVENTION

Therefore, in order to overcome such problems, it is an object of the present invention to provide a pedal and pedal-length controller for an automobile whose structure is improved so that a driver, while maintaining a sufficient distance from the steering wheel and dashboard, can drive in the most comfortable and safe position.

To accomplish the object of the present invention, there is provided a pedal for an automobile comprising a pedal lever member rotatably supported to the frame of the automobile, and a pedal plate installed to the pedal lever member, the pedal further comprising a controller for controlling the radius of gyration of the pedal plate.

To accomplish the object of the present invention, there is provided a pedal-length controller for an automobile comprising: a pedal lever member rotatably supported to the frame of the automobile; a pedal plate installed to the pedal lever member; an auxiliary pedal member connected to the pedal plate; and connection means for connecting the auxiliary pedal member to the pedal plate.

BRIEF DESCRIPTION OF THE INVENTION

The above object and advantages of the present invention will become more apparent by describing in detail a preferred embodiment thereof with reference to the attached drawings in which.

DETAILED DESCRIPTION OF THE INVENTION

Figure 2:
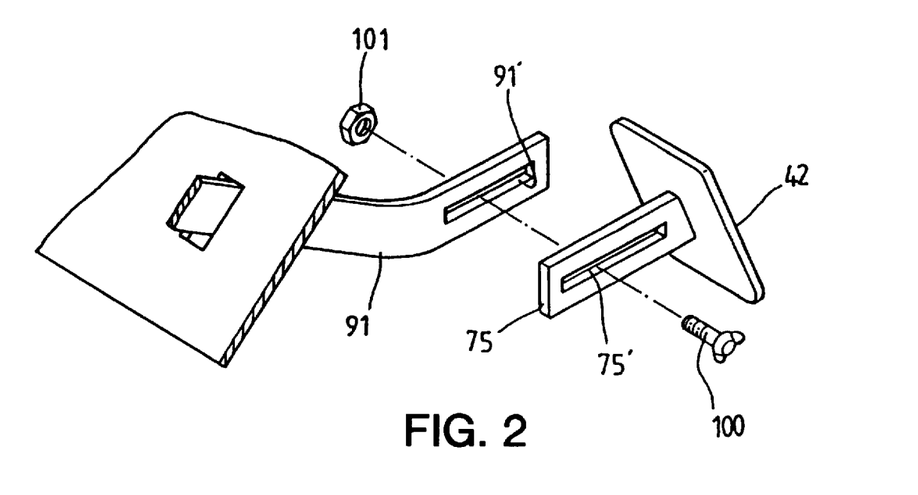
FIG. 2 is a schematic exploded perspective view of a pedal for an automobile of the present invention.

FIG. 2 shows a pedal for an automobile of the present invention having a controller for controlling the radius of gyration of a pedal plate 42. The controller is constructed so that a slot 91' is formed on a pedal lever member 91 rotatably supported to the frame of an automobile, and an extension lever 75, in which a slot 75' is formed corresponding to slot 91' of pedal lever member 91, is formed on pedal plate 42. Pedal lever member 91 and extension lever 75 are placed so as to oppose each other at a predetermined position and are fixed together with a fastening member via the slots. Here, the fastening member is comprised of a bolt 100 and a nut 101 coupled to slots 91' and 75', as shown in FIG. 2.

Figure 3:
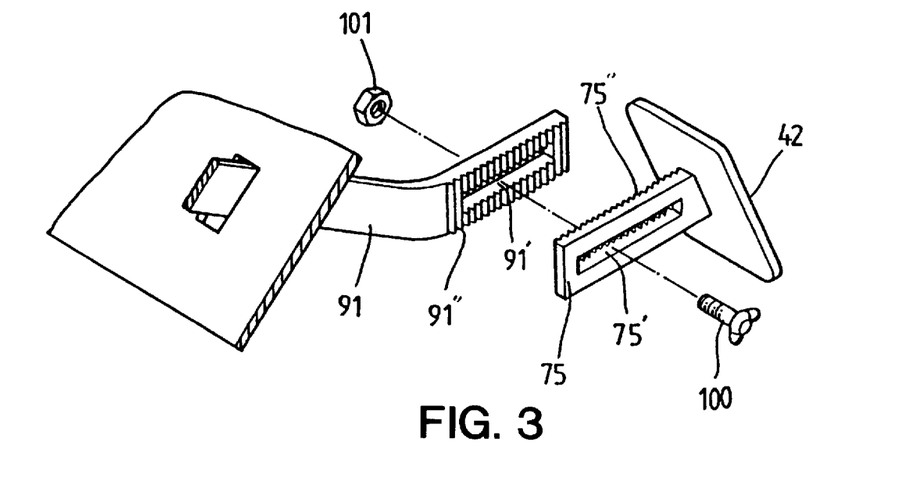
FIG. 3 is an exploded perspective view of a first embodiment of the automobile pedal of the present invention.

In order to prevent extension lever 75 from slipping on pedal lever member 91, as shown in FIG. 3, protrusions 9" and 75" are formed on the contact surfaces of pedal lever member 91 and extension member 75.

Figure 4:
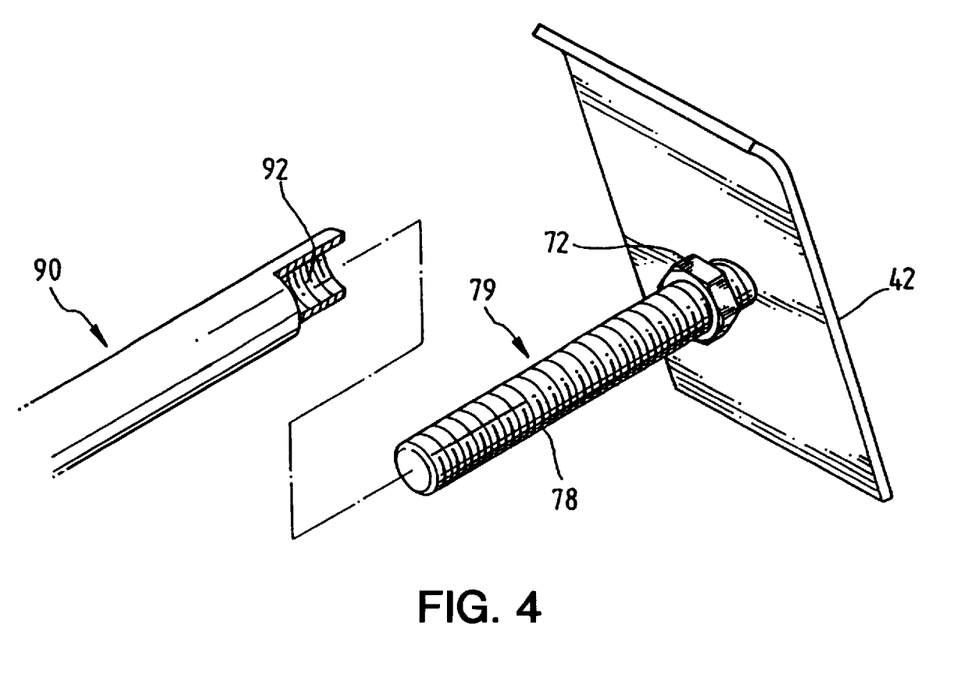
FIG. 4 is an exploded perspective view of a second embodiment of the pedal for an automobile of the present invention.

FIG. 4 shows another embodiment of the controller of the present invention.

Referring to FIG. 4, a pedal lever member rotatably supported to the frame of an automobile is constructed so that a circular rod 90 is formed with a female screw 92. An extension rod 79 with a male screw 78 is provided on pedal plate 42 which the driver's foot touches, so as to be coupled with circular rod 90. Here, if pedal plate 42 rotates, the radius of gyration of pedal plate 42 is varied as extension rod 79 is screwed into or unscrewed from circular rod 90.

Meanwhile, a nut 72 is coupled to extension rod 79 so as to prevent extension rod 79 from unfastening on circular rod 90. Extension rod 79 is located at a position of circular rod 90 by rotating extension rod 79, and nut 72 is tightened to be in contact with the end of circular rod 90. The loosening of extension rod 79 is prevented due to the fastening force of nut 72. After pedal plate 42 is controlled to have a predetermined radius of gyration, the controlled state is stably maintained by the coupling of nut 72.

Figures 5, 5A:
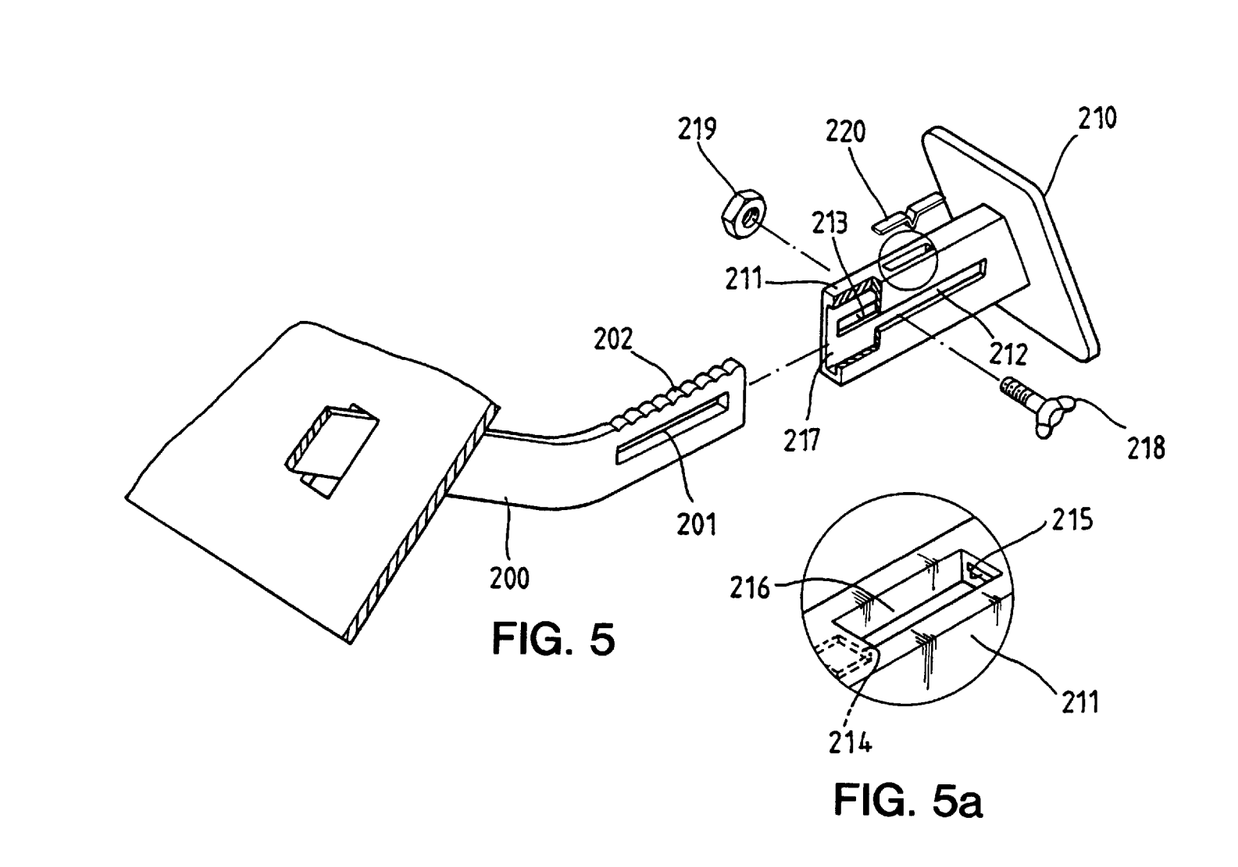
FIG. 5 is an exploded perspective view of a third embodiment of the pedal for an automobile of the present invention.
FIG. 5a is an enlarged view of the first embodiment of the pedal.

FIG. 5 shows still another embodiment of the controller. Referring to FIG. 5, a slot 201 is formed on the side of a pedal lever member 200 rotatably supported to the frame of automobile. A plurality of protrusions 202 are formed on the top of the pedal lever member. A hollow lever 211 having a coupling hole 217 to which pedal lever member 200 is connected, is extended from a pedal plate 210 which the driver's foot touches. Holes 216, 212 and 213 respectively communicating with coupling hole 217 are formed on the top and either side of pedal lever member 200. A leaf spring 220 resiliently coming into contact with protrusions 202 is coupled to hole 216. Insertion holes 214 and 215 to which a leaf spring 220 is coupled are formed on the opposite walls of hole 216. In the state in which hollow lever 211 is coupled to fixed pedal lever member 200, when hollow lever 211 moves, leaf spring 220 is elastically displaced while in contact with protrusions 202. Here, hollow lever 211 can stop temporarily at a predetermined position of pedal lever member 200. Therefore, hollow lever 211 can be fastened with bolt 218 and nut 219 in the state in which hollow lever 211 stops stably at a desired position.

The above-explained pedal of the present invention has the following operation effects. Extension lever 75 is placed at an appropriate position on pedal lever member 91 and are fixed by bolt 100 and nut 101 so that the driver can operate pedal plate 42 when the distance between the driver and the steering wheel or dashboard is appropriately controlled according to the leg length of the driver. Under these circumstances, it is easy for the driver to observe the forward and rear areas and convenient to operate the dashboard instrumentation while driving.

Meanwhile, a pedal-length controller of the present invention is constructed as follows.

Figure 6:
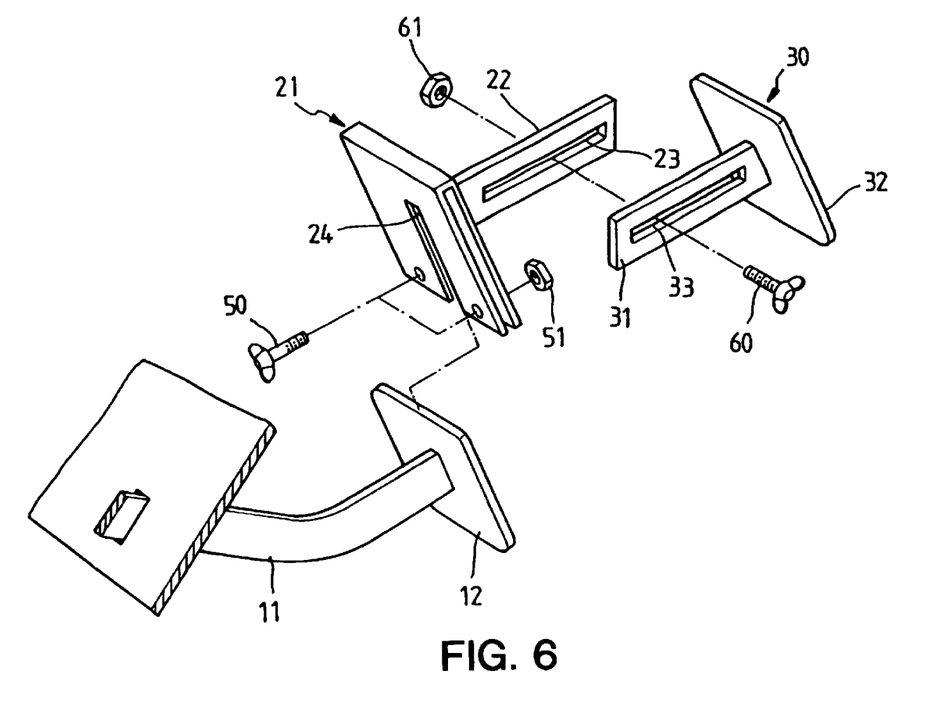
FIG. 6 is an exploded perspective view of a first embodiment of the pedal-length controller of an automobile of the present invention.

Referring to FIG. 6, the controller comprises a pedal lever member 11 rotatably supported to the frame of an automobile, a pedal plate 12 fixed thereto, an auxiliary pedal member 30 to be connected to pedal plate 12, and connection means for connecting pedal plate 12 and auxiliary pedal member 30.

The connection means comprises a coupling member 21 connected to pedal plate 12, a fastening member such as a bolt 60 and nut 61 for fixing auxiliary pedal member 30 to coupling member 21. A connection lever 22 in which a slot 23 is formed is extendedly formed on coupling member 21. Auxiliary pedal member 30 has a control lever 31 in which a slot 33 is formed corresponding to connection lever 22, and an operation plate 32 fixed to control lever 31.

Figure 7:
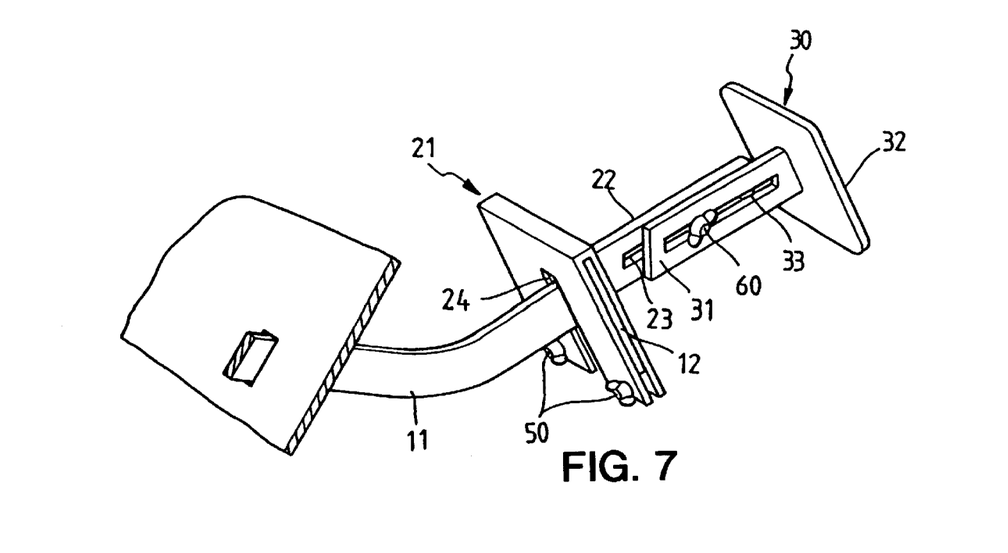
FIG. 7 is a perspective view of the controller shown connected to the automobile pedal of FIG. 6.

Here, coupling member 21 is shaped such that pedal plate 12 is received thereinto, as shown in FIG. 6. A slit 24 into which pedal lever member 11 is inserted is formed thereon as shown in FIG. 7. The coupling member 21 is fixed to pedal plate 12 with bolt and nut 51 as shown in FIGS. 6 and 7.

Figure 8:
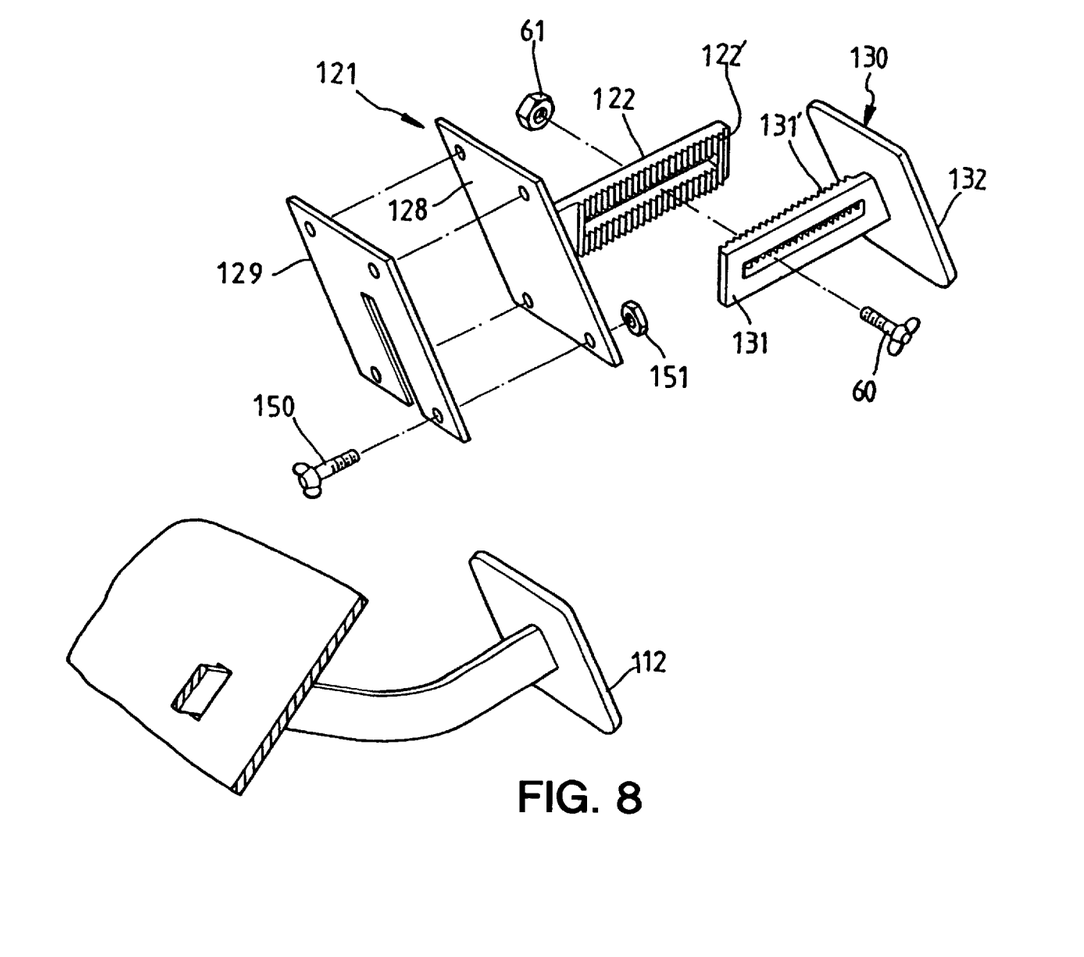
FIG. 8 is a perspective view of a second embodiment of the pedal-length controller for an automobile of the present invention.

As shown in FIG. 8, connection member 121 can be constructed to have a plate 128 fixed to the end of connection lever 122 and an additional auxiliary plate 129 so as to be directly fastened to pedal plate 112 with bolt 150 and nut 151. This two-piece connection member is easier to manufacture than the aforementioned connection member of FIGS. 5 and 6.

Figure 9:
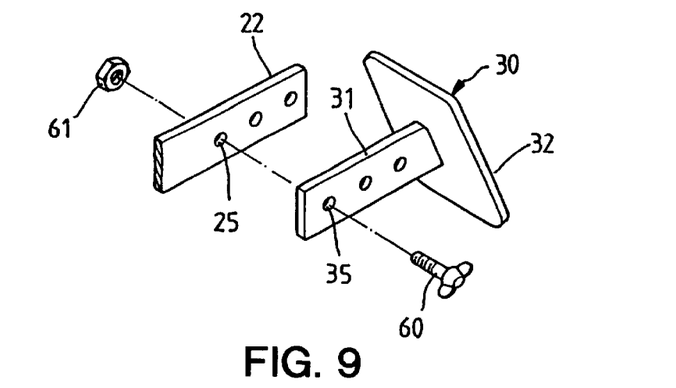
FIG. 9 is a perspective view of a third embodiment of the pedal-length controller for an automobile of the present invention.

As shown in FIG. 9, through-holes 25 and 35 through which bolt 60 passes may be formed on connection lever 22 and control lever 31 at predetermined intervals. This allows auxiliary pedal member 30 to be appropriately fixed at connection member 20. In this case, in which through-holes 25 and 35 are formed along connection lever 22 and control lever 31 so that they may be fastened with bolt 60, a potentially hazardous situation during driving can be prevented since control lever 31 is supported to connection lever 22 by bolt 60 even when bolt 60 becomes partially unfastened.

Figure 10:
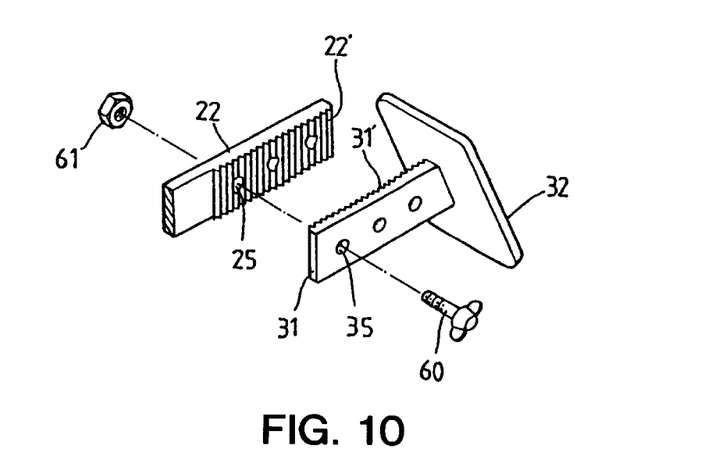
FIG. 10 is a perspective view of a fourth embodiment of the pedal-length controller for an automobile of the present invention.

As shown in FIGS. 8 and 10, protrusions 22', 122', 31' and 131'which engage with each other are formed on connection lever 22 (122) and control lever 31 (131) so as to prevent control lever 31 and 131 fastened with bolt 60 and nut 61 from sliding on connection lever 22 and 122.

Figure 11:
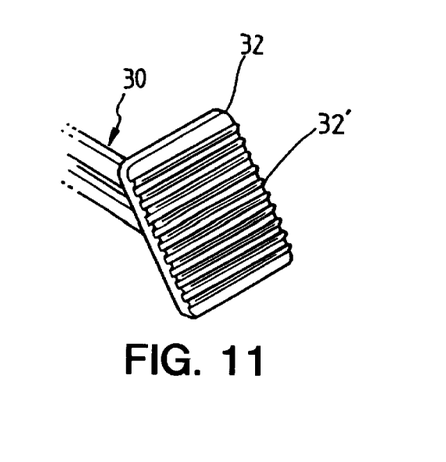
FIG. 11 is a perspective view of a fourth embodiment of the pedal plate of the present invention.

Meanwhile, protrusions 32', as shown in FIG. 11, are formed on operation plate 32 of auxiliary pedal member 30 so that when the driver operates operation plate 32, his or her foot does not slide thereon.

Figure 12:
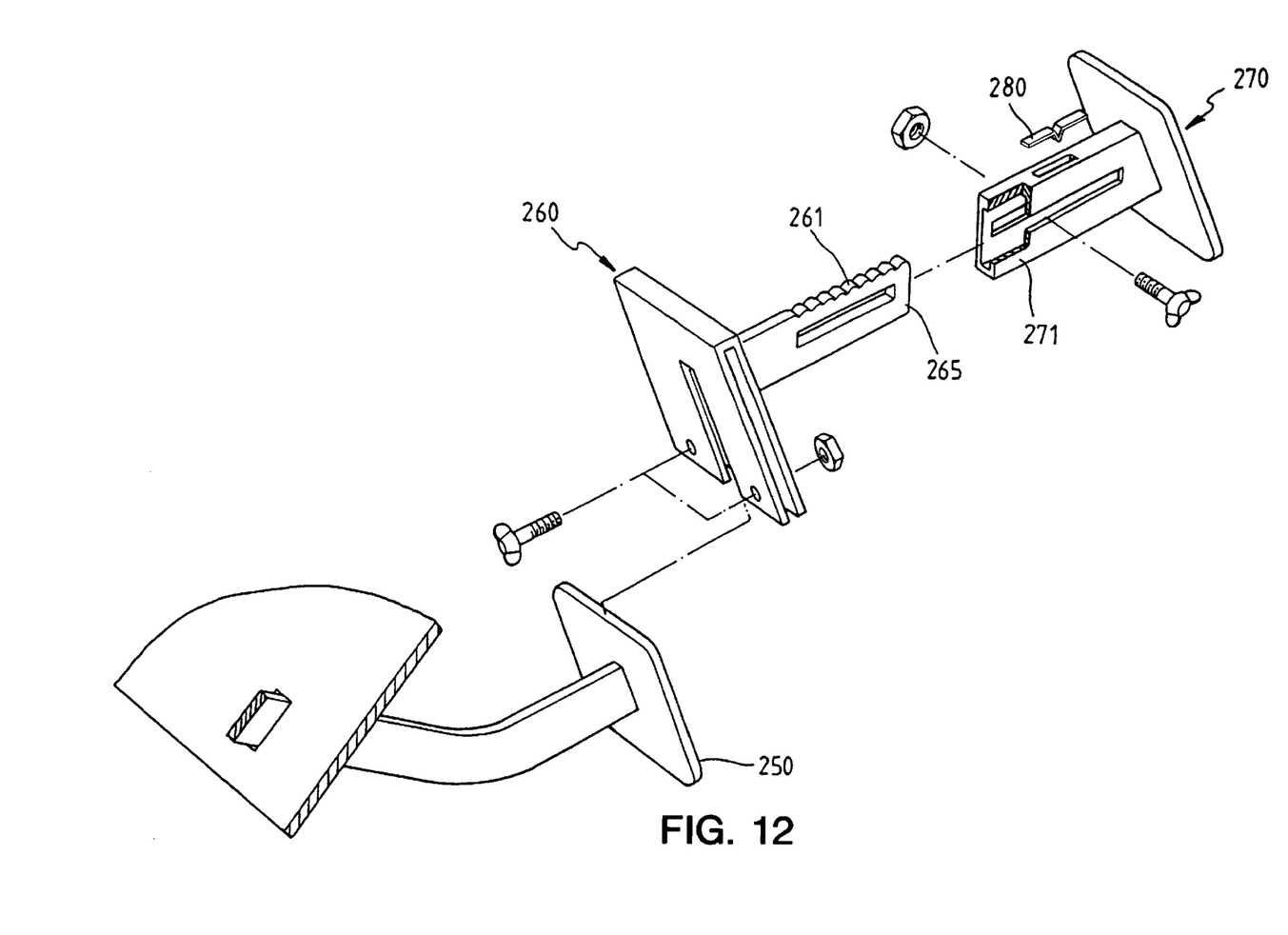
FIG. 12 is an exploded perspective view of the preferred and fifth embodiment of the pedal-length controller for an automobile of the present invention.

FIG. 12 is an exploded perspective view of another embodiment of the pedal-length controller of the present invention. Reference numeral 260 is a connection portion coupled to a pedal plate 250. Protrusions 261 are formed on the top of a connection lever 265 extended from connection portion 260. A hollow lever 271 to which connection lever 265 is coupled is extended from an auxiliary pedal member 270. A leaf spring 280 in contact with protrusions 261 are coupled to the top of lever 271. This embodiment is similar to that of FIG. 5, whose operation will not be described.

The assembling and operation-effect of the pedal-length controller for an automobile of the present invention will be described below.

First, in assembling, connection member 21 is coupled to pedal plate 12 and the coupling is fixed with bolt 50 and nut 51. Control lever 31 of auxiliary pedal member 30 is fastened to connection lever 22 with fastening members 60 and 61. Here, control lever 31 is fixed to a position of connection lever 22 in accordance with the driver's leg length. With the pedal-length controller for an automobile of the present invention assembled as above, auxiliary pedal member 30 is fixed at an appropriate position of connection member 20 in accordance with driver leg length and with the position of the driver's seat adjusted as desired, so that driving can be performed comfortably and safely by adequately maintaining the distance between the driver and the steering wheel or dashboard. Further, the height of auxiliary pedal member 30 can be controlled in accordance with the angle of the driver's legs at which driving is performed most comfortably for a given driver.

As described above, the present invention has the following advantages: first, automobile operation can be performed at a position where a driver is able to observe forward and rear areas at the same time, by controlling the radius of gyration of the auxiliary pedal member; second, the radius of gyration of the auxiliary pedal member can be controlled to maintain a predetermined distance between the driver's seat and the dashboard to promote safety and provide convenience in the manipulation the automobile's systems; and third, the radius of gyration of the auxiliary pedal member can be controlled so as to maintain the driver's legs in a comfortable position while driving.

What is claimed is:

1. An adjustable pedal-length controller in an automobile comprising:

a pedal lever member rotatably supported to the frame of the automobile;

a pedal plate installed on the pedal lever member;

a coupling member connected to said pedal plate, said coupling member having a connection lever extending therefrom and formed with a plurality of protrusions on a top of said connection lever;

an auxiliary pedal member comprised of an auxiliary pedal plate and a hollow lever extending therefrom, said connection lever insertably coupled within said hollow lever, the hollow lever having a wall thickness and including a hole in a top portion of the hollow lever, the hole extending through said wall thickness whereby at least two of said protrusions are at least partially exposed through the hole when the connection lever is inserted into the hollow lever, said wall thickness adjacent said hole including at least one insertion slot; and a leaf spring contained within said hole of said hollow lever and in resilient contact between said at least two protrusions, said spring coupled to said at least one insertion slot within said hole for providing said auxiliary pedal plate with the capacity to be temporarily stopped and supported at various positions of adjustment wherein said spring does not project outside of said hole of said hollow lever.

2. An adjustable pedal-length controller in an automobile comprising:

a pedal plate connected to an automobile pedal lever member;

a coupling member enveloping said pedal plate, said coupling member having an operator-facing side and a pedal-lever side, said operator-facing side having a connection lever centrally extending therefrom and formed with a plurality of equally spaced protrusions along a top face of said connection lever;

an auxiliary pedal member composed of an auxiliary pedal plate having an operator-facing side and a pedal-lever side and a hollow lever connected to said pedal-lever side of said auxiliary pedal plate, said hollow lever coupled to said connection lever, the hollow lever having a wall thickness and including a hole in a top portion of the hollow lever, the hole extending through said wall thickness whereby at least two of said protrusions are at least partially exposed through the hole when the connection lever is inserted into the hollow lever, said wall thickness adjacent said hole including at least one insertion slot; and a leaf spring retained within said hole of said hollow lever and in resilient contact between said at least two protrusions on said connection lever, said leaf spring coupled to said at least one insertion slot, wherein said spring does not project outside of said hole of said hollow lever, said leaf spring providing said controller with the capacity to be temporarily stopped and supported at various positions of adjustment corresponding to each of said protrusions.

3. The adjustable pedal-length controller in an automobile as claimed in claim 2 wherein protrusions are formed on said auxiliary pedal member so that a foot of an operator does not slip therefrom when operating said auxiliary pedal member.

4. An adjustable pedal-length controller in an automobile having an automobile pedal lever rotatably connected to the frame of the automobile, said automobile pedal lever including a pedal plate that is moveable by an operator, comprising: a coupling member in enveloped engagement with the pedal lever, wherein said coupling member includes a connection lever connected thereto and projecting therefrom and towards said operator, said coupling member having a U-shaped configuration for containing said pedal lever therein, one leg of said U-shaped coupling member including a vertically disposed slit for receiving said pedal lever therethrough, said connection lever having a top face that is formed with a plurality of protrusions, at spaced, predetermined intervals, an auxiliary pedal member formed by an auxiliary pedal plate and a hollow lever projecting from one side of said auxiliary pedal plate towards said pedal lever wherein said connection lever is slidingly received within said hollow lever for fastenable connection thereto, the hollow lever having a wall thickness and including a hole in a top portion of the hollow lever, the hole extending through said wall thickness wherein at least two of said protrusions are at least partially exposed through the hole when the connection lever is inserted into the hollow lever, said wall thickness adjacent the hole including at least one insertion slot, a leaf spring retained within said hole of said hollow lever and coupled to said top face of said connection lever for creating resilient contact between said protrusions when said connection lever is inserted within said hollow lever, said leaf spring coupled to said at least one insertion slot, wherein said spring does not project outside of said hole of said hollow lever, the leaf spring is elastically displaced while in contact with said protrusions such that said hollow lever has the capacity to be temporarily stopped and supported at various positions of adjustment corresponding to each of said protrusions.

5. The adjustable pedal-length controller in an automobile as claimed in claim 4, wherein protrusions are formed on said auxiliary pedal member so that a foot of the operator does not slip therefrom when operating said auxiliary pedal member.

6. An adjustable pedal-length controller in an automobile having a pedal lever member rotatably supported to the frame of the automobile, and a pedal plate installed on the pedal lever member, comprising:

a coupling member in enveloped engagement with said pedal plate, said coupling member having a U-shaped configuration for containing said pedal lever member therein, one leg of said U-shaped coupling member including a vertically disposed slit for receiving said pedal lever member therethrough, and a connection lever connected thereto and projecting therefrom and toward an operator having a top face that is formed with a plurality of protrusions at spaced, predetermined intervals;

an auxiliary pedal member formed of an auxiliary pedal plate and a hollow lever extending therefrom, said connection lever slidingly received within said hollow lever for fastenable connection thereto, the hollow lever having a wall thickness and including a hole in a top portion of the hollow lever, the hole extending through said wall thickness wherein at least two of said protrusions are at least partially exposed through the hole of the hollow lever when the connection lever is inserted into the hollow lever, said wall thickness adjacent said hole including at least one insertion slot;

a leaf spring retained within said hole of said hollow lever and couplable to said top face of said connection lever for creating resilient contact between said protrusions when said connection lever is inserted within said hollow lever, said leaf spring coupled to said at least one insertion slot wherein said spring does not project outside of said hole of said hollow lever, said leaf spring is elastically displaced while in contact with said protrusions such that said hollow lever has the capacity to temporarily stop and support said hollow lever allowing said operator the ability to predetermine an operationally ideal pedal position before rigidly securing said auxiliary pedal member to said pedal lever member;

a connection lever slot in said connection lever;

a hollow lever slot in said hollow lever, said hollow lever slot and said connection lever slot being alignable;

fastening means insertable within said hollow lever slot and said connection lever slot, said fastening means comprising a nut threadable onto a screw for rigidly securing said auxiliary pedal member to said pedal lever member; and a plurality of auxiliary pedal member protrusions formed on said auxiliary pedal member so that a foot of the operator does not slip therefrom when operating said auxiliary pedal member.

* * * * *